(12) United States Patent
Backman

(10) Patent No.: US 9,066,161 B2
(45) Date of Patent: Jun. 23, 2015

(54) SYSTEMS AND METHODS FOR PHYSICAL LINK ROUTING

(71) Applicant: Airstone Labs, Inc., San Francisco, CA (US)

(72) Inventor: Kai Backman, San Francisco, CA (US)

(73) Assignee: Airstone Labs, Inc., San Francisco, CA (US)

( * ) Notice: Subject to any disclaimer, the term of this patent is extended or adjusted under 35 U.S.C. 154(b) by 0 days.

(21) Appl. No.: 14/529,038

(22) Filed: Oct. 30, 2014

(65) Prior Publication Data

US 2015/0117859 A1 Apr. 30, 2015

Related U.S. Application Data

(60) Provisional application No. 61/897,337, filed on Oct. 30, 2013, provisional application No. 61/991,812, filed on May 12, 2014.

(51) Int. Cl.
*G02B 6/26* (2006.01)
*H04Q 11/00* (2006.01)

(52) U.S. Cl.
CPC ... *H04Q 11/0005* (2013.01); *H04Q 2011/0035* (2013.01); *H04Q 2011/0037* (2013.01)

(58) Field of Classification Search
CPC .......... G02B 6/12007; G02B 6/29395; G02B 6/2938; G02B 6/28; G02B 6/26
USPC ......................................... 385/15, 24, 39, 50
See application file for complete search history.

(56) References Cited

U.S. PATENT DOCUMENTS

| | | | |
|---|---|---|---|
| 4,805,226 A * | 2/1989 | Guebey ........................ 382/260 |
| 5,970,232 A | 10/1999 | Passint et al. | |
| 8,144,853 B1 * | 3/2012 | Aboujaoude et al. .... 379/201.05 |
| 2006/0247902 A1 | 11/2006 | Rourke | |
| 2010/0254312 A1 | 10/2010 | Kennedy | |
| 2011/0200294 A1 | 8/2011 | Case | |
| 2011/0229086 A1 | 9/2011 | Bradley et al. | |
| 2011/0268115 A1 | 11/2011 | Attarwala et al. | |
| 2012/0076150 A1 | 3/2012 | Perlman | |
| 2012/0185216 A1 | 7/2012 | El-Essawy et al. | |
| 2013/0031270 A1 | 1/2013 | El-Essawy et al. | |

* cited by examiner

*Primary Examiner* — Jennifer Doan
(74) *Attorney, Agent, or Firm* — Jeffrey Schox; Thomas Gwinn

(57) ABSTRACT

A system for physical link routing includes a link routing block, comprising a volume of solid material, that defines a set of link routing paths; and a first link interface, comprising a set of access points arranged in a pattern, wherein each access point of the set of access points is associated with an endpoint of a link routing path.

14 Claims, 11 Drawing Sheets

Wiring using Link Routing System

SYSTEMS AND METHODS FOR PHYSICAL LINK ROUTING

CROSS-REFERENCE TO RELATED APPLICATIONS

This application claims the benefit of U.S. Provisional Application Ser. No. 61/897,337, filed on 30 Oct. 2013, and U.S. Provisional Application Ser. No. 61/991,812, filed on 12 May 2014, both of which are incorporated in their entireties by this reference.

TECHNICAL FIELD

This invention relates generally to the computer networking field, and more specifically to new and useful systems and methods for physical link routing in the computer networking field.

BACKGROUND

Computer networking is an important part of designing supercomputers or other high performance computer clusters; networking enables nodes to cooperate in performing tasks (and thus reduce the time required to perform tasks). Current methods of computer networking for supercomputers typically involve linking nodes to one another using conductive wire and/or optical fiber. For small link numbers or short linking distances, this linking may conceivably be accomplished using printed circuit board techniques; but as link number increases, this technique becomes increasingly infeasible. In light of this, supercomputers with large link numbers are typically manually wired by skilled technicians. This method of networking is time-consuming and prone to error. Thus, there is a need in the computer networking field to create systems and methods for physical link routing. This invention provides such new and useful systems and methods.

DESCRIPTION OF THE PREFERRED EMBODIMENTS

Figure 1:
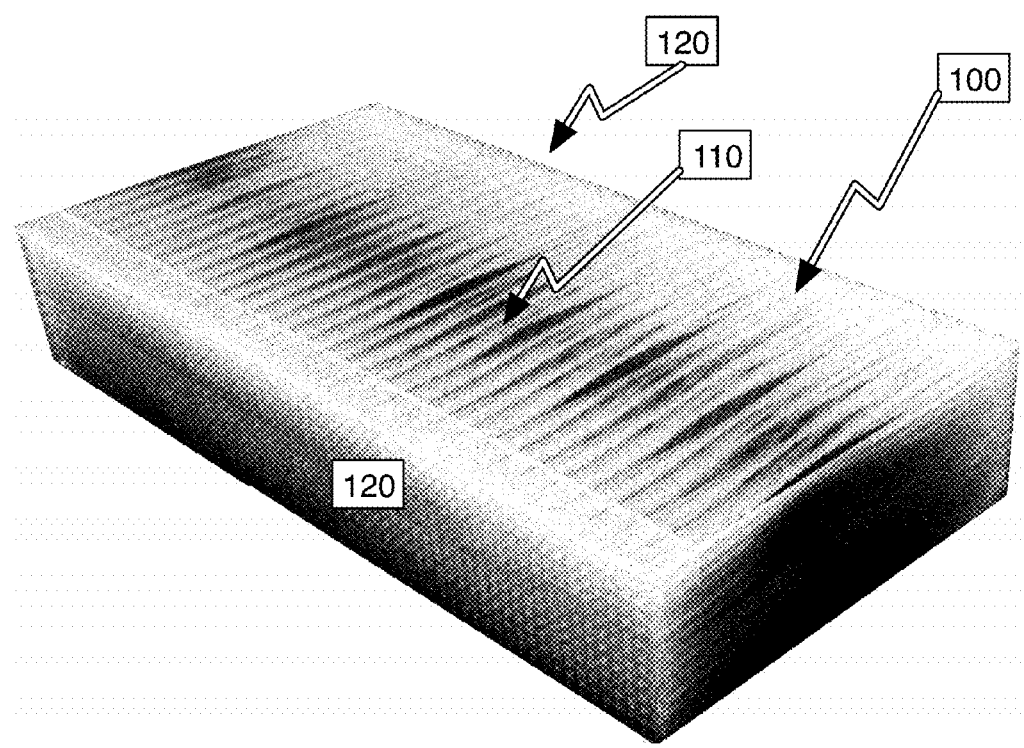
FIG. 1 is a diagram view of a system of a preferred embodiment.

The following description of the preferred embodiments of the invention is not intended to limit the invention to these preferred embodiments, but rather to enable any person skilled in the art to make and use this invention.

The systems and methods for physical link routing of preferred embodiments function to encode the complexity of node-to-node mapping of computing network topologies into a physical element with an ordered interface. As one potential benefit, the systems and methods can greatly simplify the task of establishing node connections—enabling new levels of topology complexity, reducing wiring time, and reducing if not eliminating wiring errors.

Supercomputers (and high performance computing clusters in general) play an important role in solving computationally intensive tasks in a variety of fields, including quantum mechanics, weather forecasting, climate research, molecular modeling, and cryptography. In many cases, breakthroughs in these fields are only achieved with increases in computational performance.

Traditionally, supercomputers have enabled increases in computational performance by improving node performance and by increasing node number (i.e., how many nodes are contained within the supercomputer). Unfortunately, increasing node number increases computational performance only if the added nodes are accessible by the rest of the supercomputer. As a result, for supercomputers with large node numbers (e.g., all modern supercomputers), performance is heavily dependent on network topology; that is, how the nodes of the supercomputer are connected to one another. The system and method can facilitate the use of complex network topologies in supercomputers.

The system and method of the preferred embodiment can address a number of issues relating to network topologies by encoding topology information in the links of a physical link routing block with an ordered link interface. In general, topologies with large numbers of direct links result in superior performance; these topologies are typically realized through manual wiring. Manual wiring for such topologies is time-consuming and requires the labor of a skilled technician. Even if the labor to wire the links is considered appropriate, there are still physical constraints that make manual wiring of links difficult for at least two reasons. First, given that each link has to connect two unique endpoints, the technician is required to consult a wiring map for each link. Mistakes in wiring are often not detected until the supercomputer is activated, which makes them very costly to find and repair. Second, because the links may span the entire supercomputer, it is hard to increase the number of technicians working on the supercomputer because of physical constraints. Alternatives to manual wiring (switching and tiling) can place significant constraints on network topology. As a result, network topology (and thus supercomputer performance) is often limited based on economic and time constraints. The systems and methods of the preferred embodiment can preferably offer a link routing block that can be computationally designed to encode node mappings of complex topologies into a physical structure. Additionally, the systems and method of the preferred embodiment can provide an ordered and convenient link interface.

1. System for Physical Link Routing

As shown in FIG. 1, a system 100 for physical link routing includes one or more link routing blocks 110 and one or more link interfaces 120. The system 100 functions to perform at least some of the physical link routing of manual wiring, which in turn may significantly reduce the costs and errors involved in manual wiring. Furthermore, the system 100 preferably enables physical link routing without constraining network topology. In light of this, the system 100 may enable dramatic increases in supercomputer performance; for instance, by enabling the implementation of high performance non-tiling topologies such as hypercubes.

Figure 2:
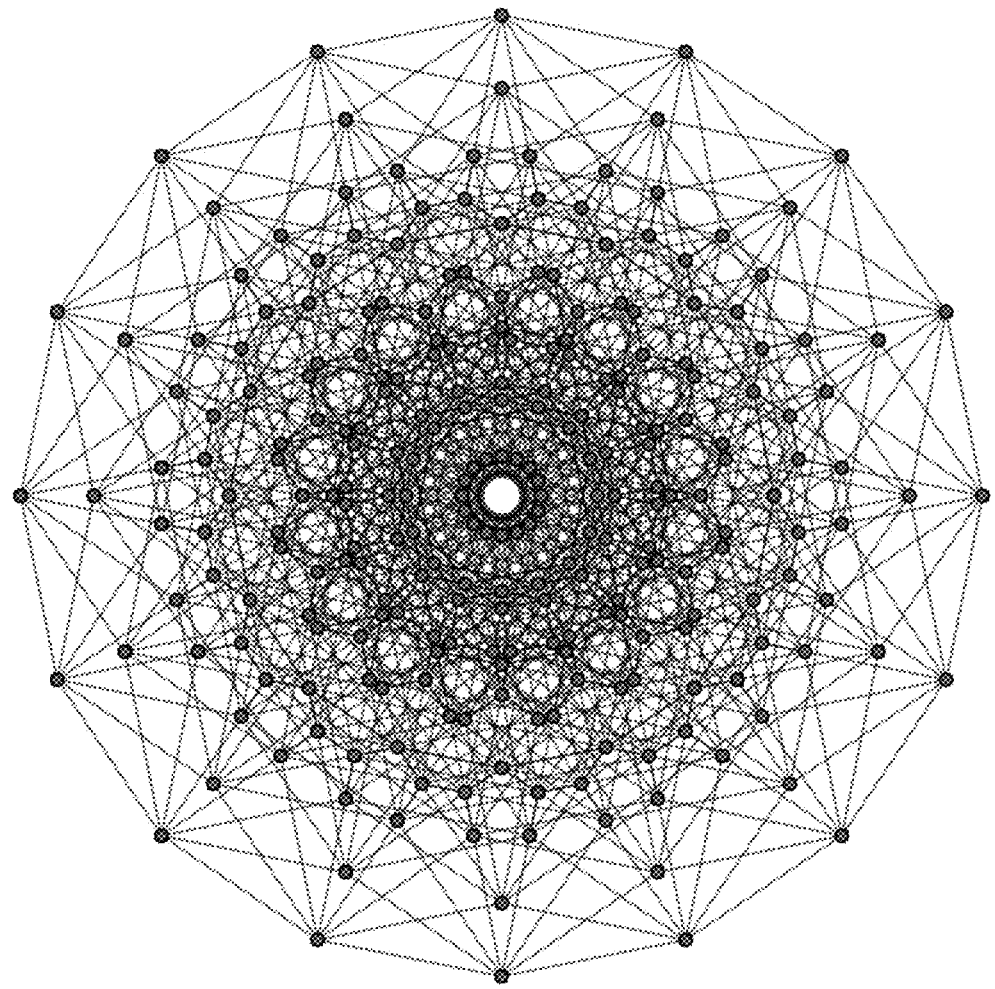
FIG. 2 is a diagram view of an eight-dimensional hypercube topology.

As shown in FIG. 2, an eight-dimensional hypercube is one example of such a topology. With some additional information, the illustration could be used as a wiring map for manually wiring 256 CPU nodes into a hypercube topology. This would require a technician to manually wire 2048 individual network cables. Even at a fast pace of 5 minutes per cable, the work would require almost two months. Use of the system 100 may enable a technician to implement the same topology in a fraction of the time, at a fraction of the cost.

The system 100 performs physical link routing by providing paths (e.g., conduits, cavities, etc.) for links to follow in the link routing block no. Links (e.g., optical fibers or conductive wires) preferably enter the link routing block 110 at a link interface 120; after entering the link routing block 110, each link preferably follows a particular path defined by the structure of the link routing block 110, before again exiting the link routing block 110 at a link interface 120. Herein, the use of entering and exiting (or entry points or exiting points) is used as illustrative descriptive terms of a first point mapped to a second point through a connecting link. One skilled in the art would readily appreciate that the points are not limited to only serving use for entry and exit. Communication may be in any suitable direction and may be bidirectional through the links. Physical insertion of links through a defined link cavity may be made from any access point associated with the cavity.

Figure 3:
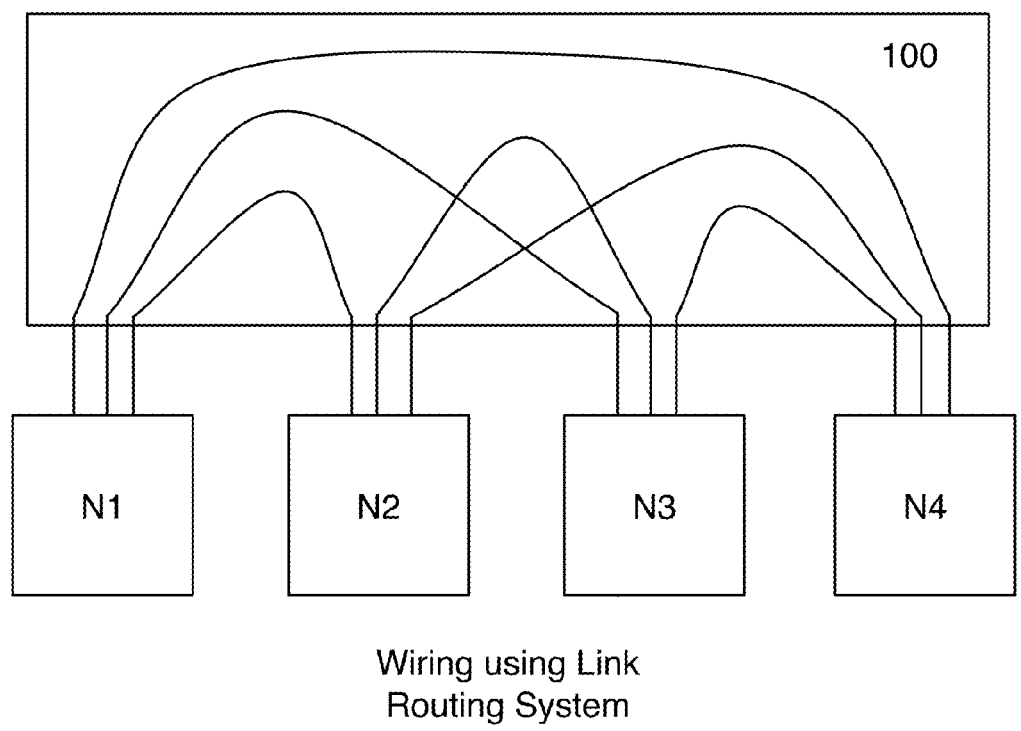
FIG. 3 is a diagram view of wiring using a system of a preferred embodiment.

The system 100 may provide a number of advantages over manual wiring. To manually wire a network, a technician must first connect one link, then another, and so on (in doing so he/she is performing physical link routing). There is no easy way for the technician to optimize these connections. For example, if the technician first wanted to connect node N1 he/she would do so as follows: Connect link to N1, walk to N2, connect link to N1, walk back to N1, connect link to N1, walk to N3, connect link to N3, and so on. The system 100 predetermines physical link routing and preferably does so in a way that makes the technician's job far easier; for example, instead of walking from node to node, he/she may simply connect the first four links to N1, then the second four links to N2, and so on as shown in FIG. 3. For a large number of links this may result in a dramatic difference in man-hours required. Further, because the link positioning at node interfaces 120 may be designed to follow a pattern (e.g., the first four correspond to N1, etc.), the technician may be much less likely to commit errors in wiring.

As an additional advantage, the system 100 may greatly reduce the effort of changing network topology. In the case of manual wiring, a technician would have to re-wire the system. In the case of the system 100, a technician would simply have to replace the system 100 (or just the link routing block 110) to change network topology.

The link routing block 110 functions to guide links along paths between entering and exiting link interfaces 120. The link routing block preferably includes a set of links, where each link preferably corresponds to one or more link interfaces 120. The link routing block 110 may guide links by providing structure for links integrated into the link routing block no (e.g., optical waveguides, optical fibers, conductive wires, etc.) or by providing cavities through which links may guided (e.g., cavities used to route inserted optical fibers or conductive wires). In both cases, the link routing block no preferably defines link paths (either by integration of links or by integration of guiding structure for links).

Links may be integrated into the link routing block 110 in any suitable manner. For example, optical fibers may be woven into a particular three-dimensional structure and plastic may be molded around the fibers, forming a block that encases the fibers and maintains the woven structure. As another example, conductive wires may be fabricated as part of the link routing block by 3D printing the link routing block; using conductive polymer for the links and non-conductive polymer for the surrounding material.

Each link routing block 110 path corresponds to two access points (an entry point and an exit point) on one or more link interfaces 120 (i.e., the entry point and exit point may be on two different link interfaces 120 or the same link interface 120) and is continuous between these two points. Each path preferably also corresponds to a substantially constant path diameter (defined in the plane perpendicular to the path vector); additionally or alternatively, paths may have a variable or undefined path diameter. In the case of integrated links, this path diameter might correspond to the diameter of the link. In the case of cavities, this path diameter might correspond to a diameter sufficiently larger to promote guiding insertion and removal of a link in the cavity. For example, the path diameter may be twenty percent larger than the diameter of the link to be inserted in the defined cavity.

Figure 4:
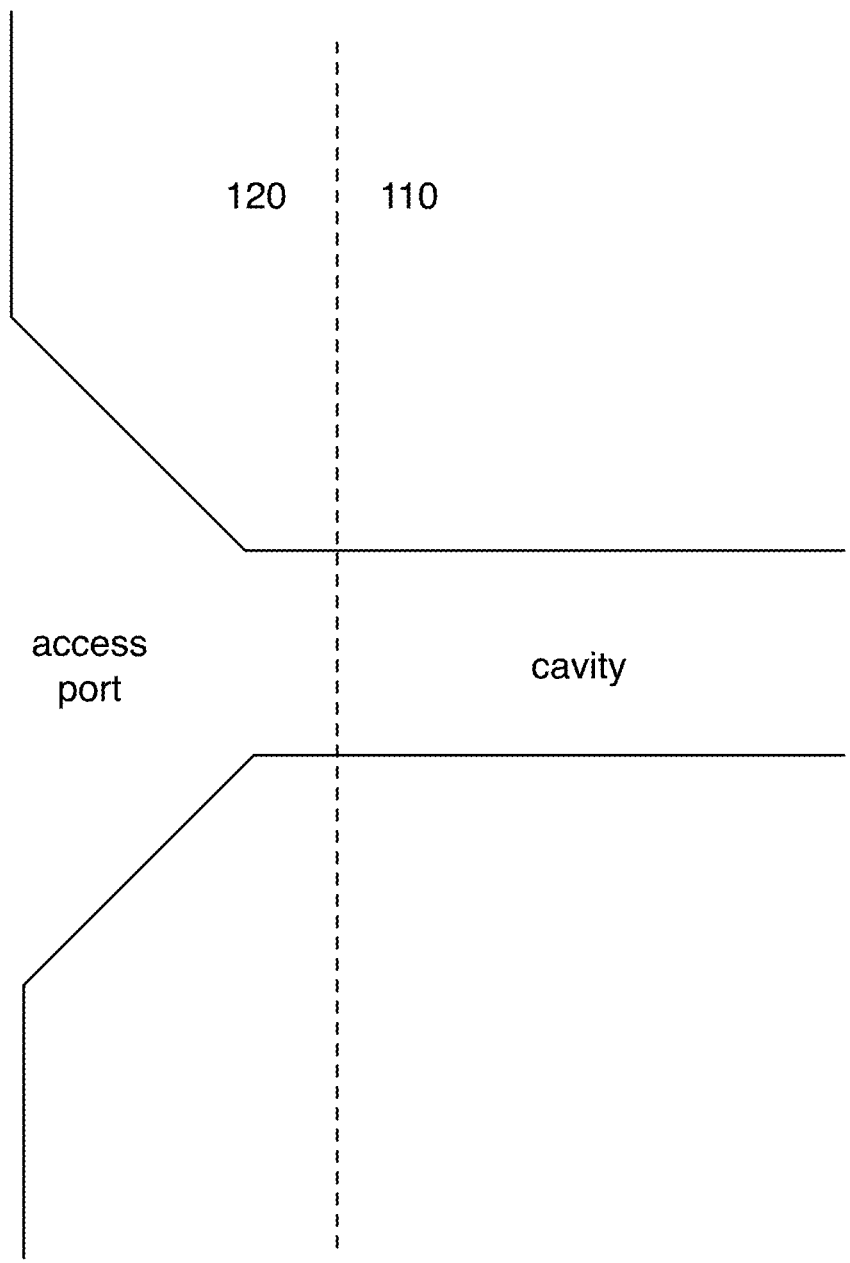
FIG. 4 is an example view of an access port of a system of a preferred embodiment.

In one variation of a preferred embodiment, link routing block 110 paths are cavities of constant diameter, except at access points (which, for cavities, may also be referred to as access ports). At access ports, the cavities expand from the main path diameter to increase ease of link insertion. An example structure with an expanding access port is as shown in FIG. 4.

Figure 5:
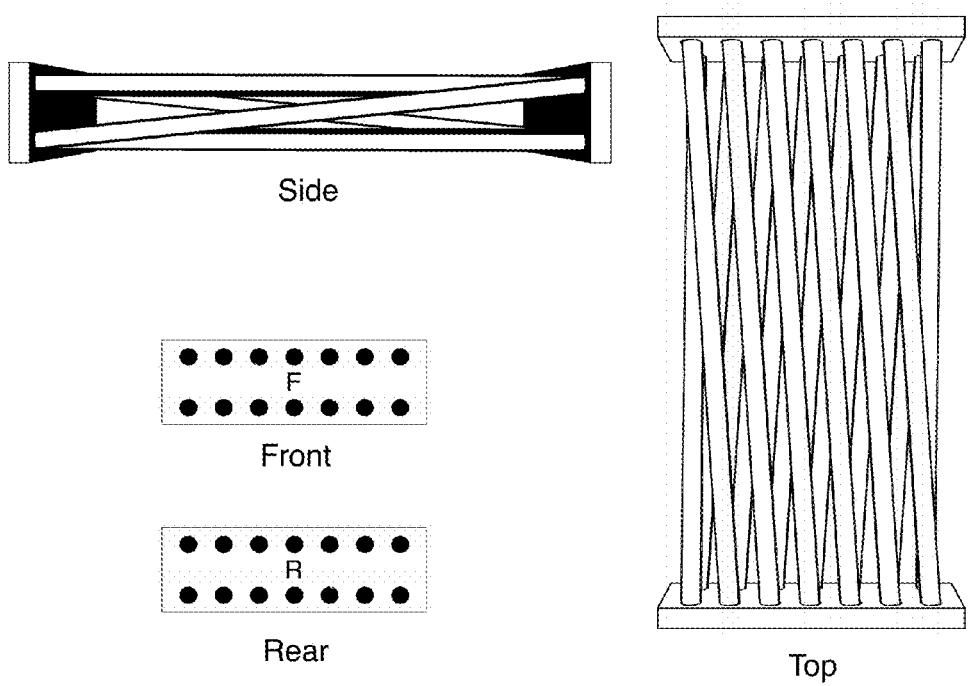
FIG. 5 is an example view of exposed cavities of a system of a preferred embodiment.
Figure 5:
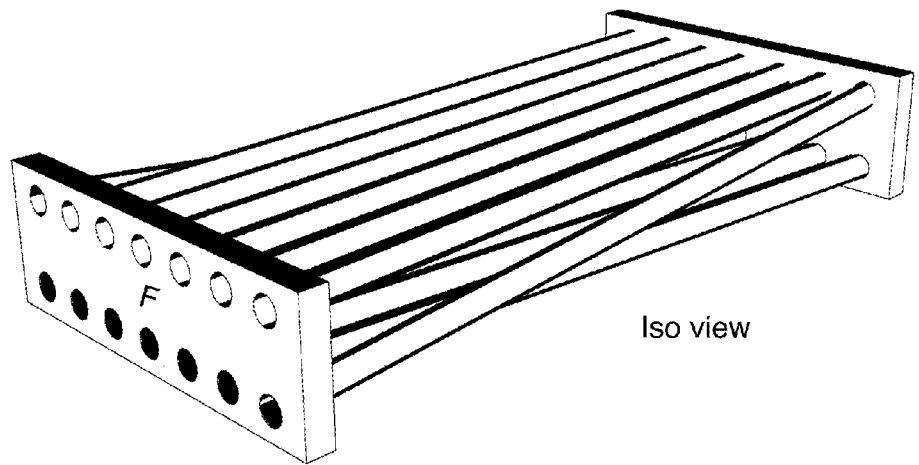
Figure 6:
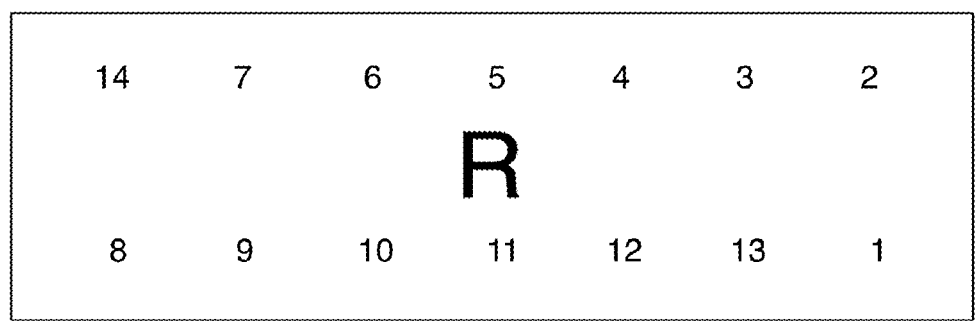
FIG. 6 is an example view of link interface correspondence.
Figure 6:
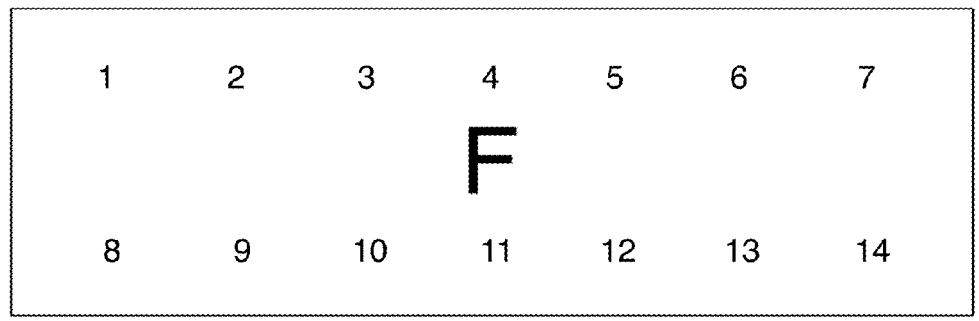

The path between a link entry and exit point may be any path of any distance and may travel in any spatial direction; however, paths preferably traverse the link routing block 110 such that links traveling along the paths do not intersect (as physical links may not be able to occupy the same space while maintaining link integrity). An example view of a link routing block no with material removed to show the cavities is as shown in FIG. 5. The paths for the same link routing block no correspond to access points as shown in FIG. 6.

Figure 7:
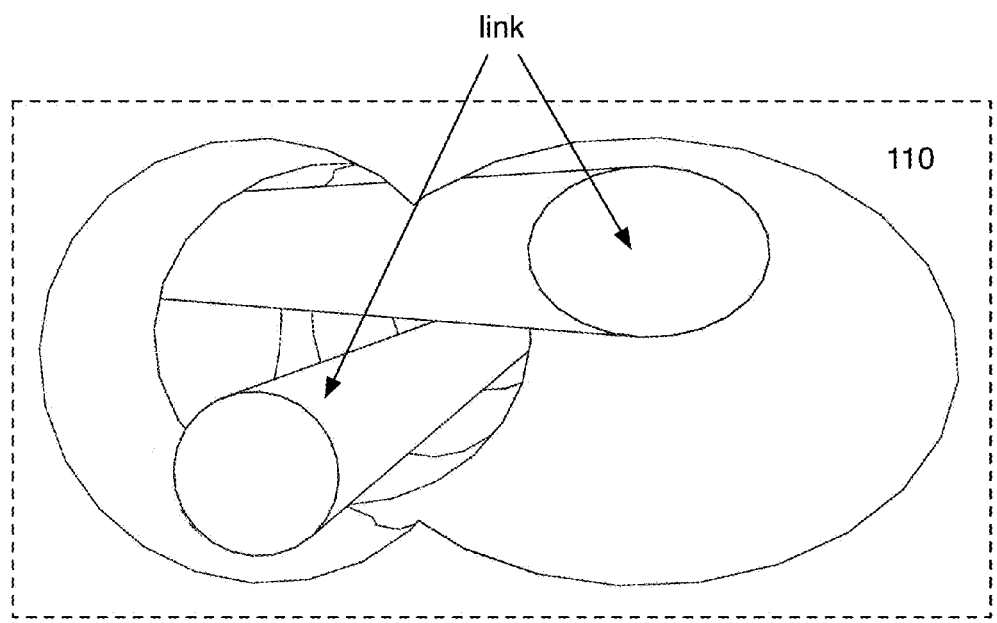
FIG. 7 is a cross-sectional view of a system of a preferred embodiment.

In the case where the link routing block no defines cavities, the paths and/or the cavities themselves may intersect if links traverse the paths and/or the cavities without occupying the same space. As shown in FIG. 7, intersecting links can include a defined cavity at the point of intersection that is greater in size than at least twice the diameter of two inserted optical fibers, such that the optical fibers pass over each other while maintaining a trajectory of each corresponding link path.

The link routing block no is preferably designed by a link routing algorithm, but may additionally or alternatively be designed in any suitable manner. The link routing algorithm preferably generates paths based on an interface scheme and a link topology (as described below), but may additionally or alternatively generate paths based on any suitable input data. The interface scheme preferably includes a set of points in three-dimensional space that represent path endpoints (which correspond to access points); the link topology preferably includes pairings of these points. The interface scheme preferably corresponds to intended wiring locations; for example, if each node is connected by six links, the interface scheme might specify path endpoints in columns of six, arranged in a plane. Thus, the first column could correspond to a first node, the second column to a second node, etc. Additionally or alternatively, the interface scheme corresponds to any set of points that are organized to aid in link connection (e.g., in a pattern easy for a technician to follow). As links will have two corresponding interface points on the link routing block (e.g., the entry and exit points), the link topology can additionally coordinate entry node connections and exit node connections.

For example, the block may have two faces wherein the topology is such that all links connect a point on a first face to a point on the second face. Similarly, all links may connect a point on one subsection of the link routing block 110 to a second subsection. For example, the set of entry points on the bottom portion of a first face may be linked to exit points on a top portion of the first face. Alternatively, there may be partial or no segregation of entry and entry points. The link topology is preferably determined by the network topology as applied to the interface scheme; that is, the network topology of the nodes connected to the system 100 is equivalent to the link topology given a particular assignment of nodes to points of the interface scheme, assuming the nodes are not connected in any other way. Accordingly, the network topology may be changed by changing how nodes are connected to the system 100 without changing the link topology; for example, by switching a node from one column of the interface scheme to another.

Figure 8:
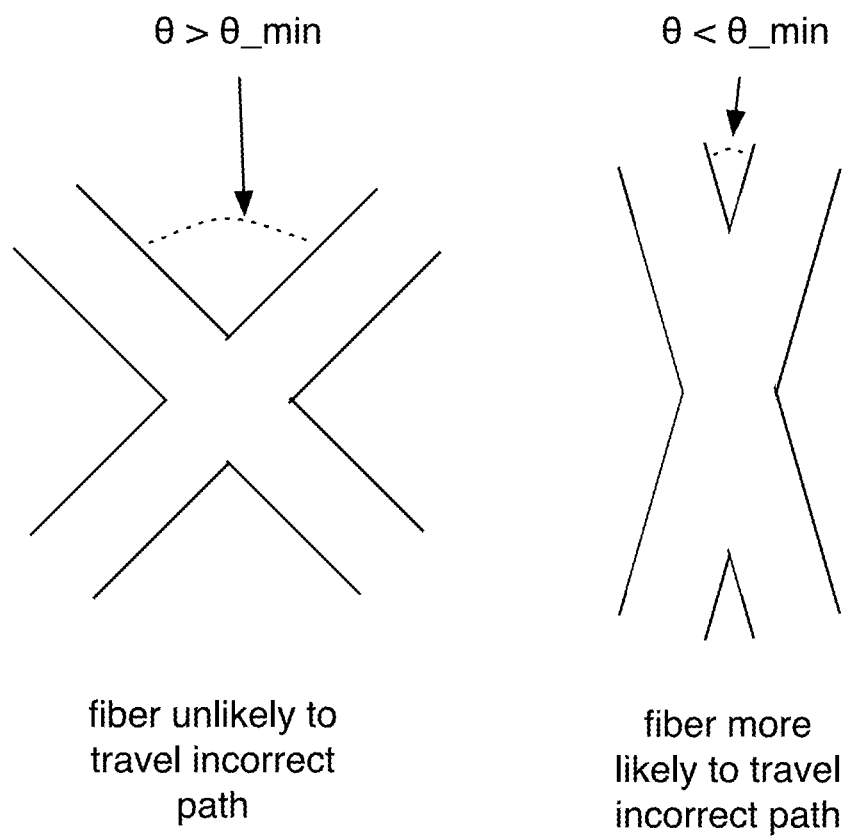
FIG. 8 is a model view of intersection angles of a system of a preferred embodiment.

The link routing block 110 may additionally be designed according to physical design constraints; for example, the link routing block 110 may have restrictions on shape (e.g., the link routing block 110 must be a rectangular prism) and/or size (e.g., the volume or longest dimension of the link routing block no must be below some threshold). As another example, paths through the link routing block 110 may be constrained to have a minimum radius of curvature (this might be necessary to keep fibers from breaking, for instance). The link routing algorithm can generate paths based in part on the physical design constraints. If the link routing block 110 defines cavities and allows path/cavity intersections, the intersections may be constrained to have a minimum angle of intersection to prevent inserted fibers from accidentally being inserted into the wrong cavity, as shown in FIG. 8. The link routing block 110 may also be designed according to manufacturing constraints; for example, designed not to have features smaller than a 3D printer's minimum feature size.

The link routing block no is preferably made of a rigid material (e.g., plastic, metal) but may additionally or alternatively be made of any suitable material. The link routing block no may be fabricated in a number of ways, including 3D printing, injection molding, laser ablation, or any other suitable method. If the link routing block 110 includes integrated links, the links may be additively fabricated as part of the link routing block no (e.g., a 3D printer prints conductive polymer for the links and non-conductive polymer for the rest of the link routing block no), the link routing block no may be fabricated around the links (e.g., conductive wires are held in their routing configuration while plastic is deposited in a mold on top of the wires), or the links may be integrated in any other suitable manner.

If the system 100 is 3D printed, it may be printed using a process that uses a support material to keep the intermediate model mechanically stable. Such support material should be easily removable using a mechanical or chemical process. For example, a solvent may be used to remove the support material. Additionally or alternatively, mechanical cleaning using fine pitch brushes, sonication, etc. may also be used in some cases to further remove support material.

The link interface 120 functions to enable the connection of links entering and exiting the link routing block 110 to nodes (or other devices). The link interface 120 preferably organizes link entry and exit points in such a way that makes connection of links to nodes simple, but may additionally or alternatively organize link entry and exit points in any suitable manner. The system 100 may include multiple link interfaces 120. For example, a link routing block may be a rectangular prism that routes links from a first face to a second face; in this case, each of the first and second faces would have at least one link interface 120.

The link interface 120 preferably enables link connection by providing physical, electrical, and/or optical access to links in the link routing block no. If the link routing block no is cavity-based (and does not include integrated links), the link interface 120 may be a series of defined holes, ports, channels, or tunnels in the link routing block 110 that allow links to be inserted into the link routing block no. The inserted link preferably has enough flexibility to conform to the path of the defined cavity of a link path. The inserted link is preferably optical cable or fiber. If the link routing block 110 includes integrated links, the link interface 120 may be a face of the link routing block 110 where the links are exposed and/or accessible for connection.

The link interface 120 may additionally or alternatively include connectors that enable nodes (or other devices) to be connected to the link routing block no. When connected to the link routing block no, a connecting element of the node (e.g., a cable with a matching connector) is preferably mechanically coupled to the link interface 120 of the system and communicatively coupled through a set of links to corresponding exit points. For example, the link interface 120 may include multi-fiber push-on (MPO) connectors, a standard for optical fiber connectors that let 24 optical fibers mate by connecting a single physical connector.

If the link interface 120 includes connectors, they may be integrated directly into the link routing block 110 or may be connected to the link routing block 110 by links. Additionally or alternatively, the connectors may be separate of the link interface 120 (and the system 100). For example, if the link routing block no is cavity based, the link interface 120 may be one or more faces of the link routing block 110 (including defined holes through which links are to be inserted). The links themselves may have connectors on either end, after exiting the system 100.

The link interface 120 is preferably organized to the previously described interface scheme. The link interface 120 is preferably based on a set of points in three-dimensional space that represent path endpoints. These points preferably correspond to intended wiring locations but may additionally or alternatively be organized in any way that aids in connection (e.g., in a pattern easy for a technician to follow). These points are preferably points at which links may be accessed (i.e., link access points).

The link access points are preferably arranged according to a geometrical pattern; e.g., points may be arranged according to a regularly spaced grid. Additionally or alternatively, link access points may be positioned or arranged in any suitable manner.

Figure 9:
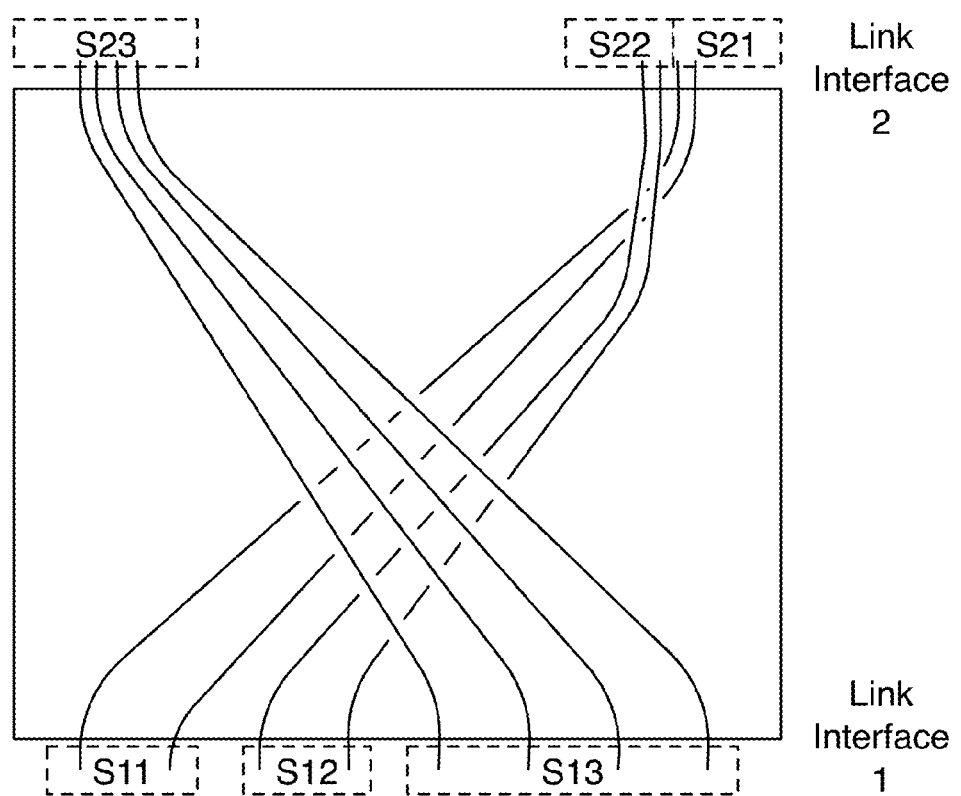
FIG. 9 is an example view of subgrids of a system of a preferred embodiment.

In a variation of a preferred embodiment, link interfaces 120 may be arranged according to a layered pattern (i.e., a pattern having multiple layers of organization). For example, link interfaces 120 may be organized using a grid and subgrid pattern structure, as shown in FIG. 9. In one example, the rectangular grid pattern of the first link interface (LI1) includes three subgrids (S11, S12, and S13), and the rectangular grid pattern of the second link interface (LI2) includes another three subgrids (S21, S22, and S23). S11 corresponds to S21; that is, all of the access points in S11 are linked to access points in S22 by paths (i.e., each access point of S11 is paired with an access point in S21). Likewise, S12 corresponds to S22 and S13 corresponds to S23. Corresponding subgrids are linked by a single transformation; that is, the transformation applied to any point of a subgrid resulting in the paired point in a corresponding subgrid may be applied to any other point of the subgrid and will result in that point's paired point. That is, if an access point location (e.g., a three-dimensional position vector) P111 in S11 is paired with an access point location P211 in S21, and $P_{211}=T_1P_{111}$ where T1 is some transformation matrix, then $P_{21n}=T_1P_{11n}$ for any set of paired points $\{P_{21n}, P_{11n}\}$. A transformation may be any suitable matrix operation on a point location; including rotation, skew, translation, reflection, scaling, or any other suitable transformation. Likewise, paired points in other subgrids share a single transformation; e.g., $P_{22n}=T_2P_{12n}$. The key differentiator between a subgrid and a grid is that all points within a particular subgrid share a transformation, but not all of the points within the grid (i.e., within multiple subgrids) share the same transformation.

In another variation of a preferred embodiment, subgrid positions are only translated (and not scaled, skewed, rotated, etc.) when transformed; as a result, points within a subgrid maintain the same positioning relative to the subgrid, but may not maintain the same positioning relative to the grid as a whole.

Figure 10:
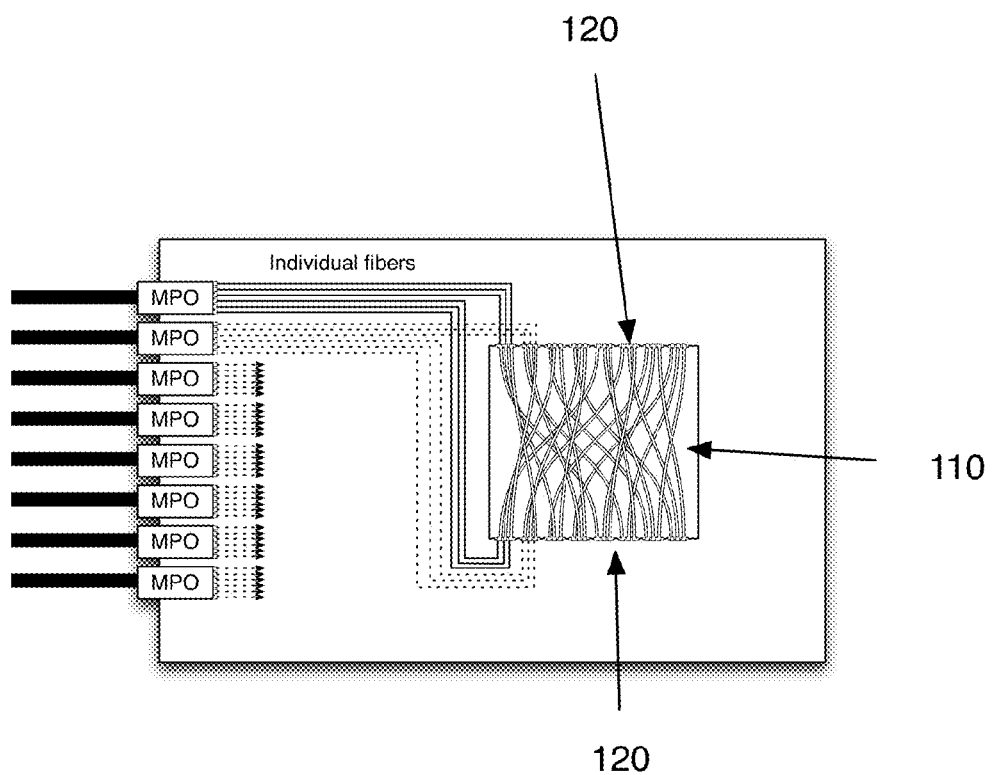
FIG. 10 is a schematic view of an example implementation of a system of a preferred embodiment.

In one example implementation, the link routing block 110 is a rectangular prism having two link interfaces 120 positioned on opposing faces of the link routing block 110, as shown in FIG. 10. The link routing block no is cavity-based; links are routed through the link routing block 110 by being fed into one link interface 120 and routed by cavities within the link routing block 110 before exiting from a second link interface 120. In this implementation, the links are individual optical fibers, which are eventually connected to six-fiber MPO connectors. The link access points on each link interface 120 are arranged in groups of three, and the link topology is arranged such that each group of three on a single link interface 120 corresponds to a different MPO connector. Likewise, each group of three on the first link interface and the group of three immediately opposite on the second link interface correspond to the same MPO connector. If the system 100 were oriented as in FIG. 10, this would mean that the first column of six link access points would correspond to a first MPO, the second column of six link access points would correspond to a second MPO, and so on.

2. Method for Designing a Link Routing System

Figure 11:
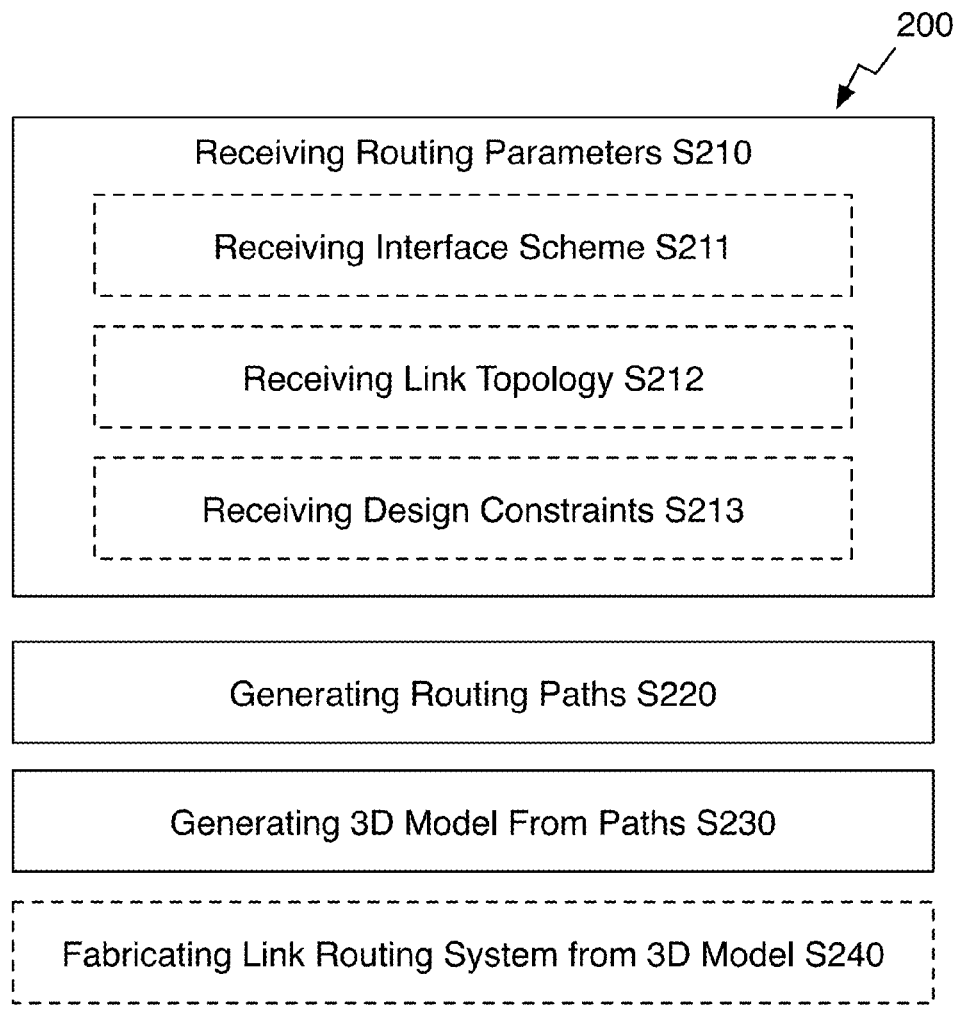
FIG. 11 is a chart view of a method of a preferred embodiment.

As shown in FIG. 11, a method 200 for designing a link routing system includes receiving routing system parameters S210, generating routing system paths S220, and generating a 3D model from the routing system paths S230. The method 200 functions to generate a link routing system substantially similar to the system 100.

Step S210 includes receiving routing system parameters. Step S210 preferably includes receiving an interface scheme S211 and receiving a link topology S212.

Step S211 includes receiving an interface scheme. The interface scheme preferably includes a set of points in three-dimensional space that represent path endpoints; the link topology preferably includes pairings of these points. The interface scheme preferably corresponds to intended wiring locations; for example, if each node is connected by six links, the interface scheme might specify path endpoints in columns of six, arranged in a plane. Thus, the first column could correspond to a first node, the second column to a second node, etc. Additionally or alternatively, the interface scheme corresponds to any set of points that are organized to aid in connection (e.g., in a pattern easy for a technician to follow).

Additionally or alternatively, S211 may include generating an interface scheme. For example, given a particular link interface (e.g., a rectangular planar surface on a link routing block), and a particular number of points, Step S211 may generate a distribution of points maximizing the distance between points. Interpoint distance and link interface dimensions are two criteria that may be used to generate interface schemes; additionally or alternatively, interface schemes may be generated using any suitable criteria.

Interface schemes may be organized according to grid and subgrid patterns; these may be inherent in the organization received in S211, or, in the case of generation, may result from generation criteria. For example, generation criteria may specify that access points be grouped in subgrids of 3 access points (optionally including the organization within the subgrid).

Step S212 includes receiving a link topology. The link topology gives pairings between points in the interface scheme; for example, if an interface scheme includes six points P1, P2, P3, P4, P5, and P6 (with associated positions), the link topology might specify $P_1 \rightarrow P_2$; $P_3 \rightarrow P_6$; $P_4 \rightarrow P_5$ where $\rightarrow$ represents a pairing/linking.

The link topology may be generated by the network topology as applied to the interface scheme; that is, the network topology of the nodes intended to be connected to the system generated by the method 200 is equivalent to the link topology given a particular assignment of nodes to points of the interface scheme, assuming the nodes are not connected in any other way. The network topology may be changed by changing how nodes are connected to the link routing system without changing the link topology; for example, by switching a node from one access point of the interface scheme to another.

Receiving routing system parameters S210 may additionally or alternatively include receiving design constraints S213. Design constraints may include restrictions on link routing system shape (e.g., the link routing system must be a rectangular prism) and/or size (e.g., the volume or longest dimension of the link routing system must be below some threshold). As another example, design constraints may include a minimum radius of curvature (this might be necessary to keep fibers from breaking, for instance) for paths through the link routing system or a minimum angle of intersection for cavities in the link routing system. Design constraints may also include manufacturing constraints; for example, a requirement that design features must be larger than a 3D printer's minimum feature size.

Step S220 includes generating routing system paths. Step S220 preferably includes generating paths based on the routing system parameters of S210, but may additionally or alternatively include generating paths based on any suitable input data. Routing system paths are preferably generated by a link routing algorithm using computational geometry methods, but may additionally or alternatively be generated in any suitable manner.

In one embodiment, the link routing algorithm works by positioning link endpoints on link interfaces and creating a geometric representation of each path between corresponding endpoints of the link interfaces. The link endpoints are preferably positioned in groups corresponding to the MPO connector that corresponding links will originate from or will be destined to. The algorithm selects positions for these ports to maintain this grouping. The output from this step is interface schemes that can be used to look up the physical position of each of the input or output ports. Interface schemes are preferably primarily designed to facilitate easier installation of links into the link routing system. The algorithm also generates the geometry for each path, taking into account the links that are intended to follow each path. By consulting the intended topology and the interface schemes the program determines what route paths need to take within the link routing system to reach from the desired input to the desired output. The path can start out as a straight path between the input and the output. The algorithm then adds some curvature to make sure the path meets design constraints (e.g., radius of curvature, non-intersection, etc.).

Step S230 includes generating a 3D model from the routing system paths. Step S230 preferably includes fusing the routing system paths using computational geometry operations. The end result is preferably a single geometric model that represents the link routing system, but may additionally or alternatively be multiple geometric models representing the link routing system. There are a number of commercial libraries like Parasolid and CGAL that can be used for performing the fusion step. A typical geometric library would either use a NURBS or a Boolean Operator based method to create the final link routing system model. The generated 3D model is preferably used in the manufacturing of the system described above.

The generated 3D model is preferably created according to manufacturing constraints of a particular manufacturing technique or tool (e.g., minimum feature size of a 3D printer), but may additionally or alternatively be adaptable to multiple manufacturing techniques or tools.

The method 200 may additionally include a fabricating link routing system from the 3D model S240. Step S240 functions to fabricate part or all of the link routing system designed by the method 200.

Step S240 preferably includes fabricating the link routing system by 3D printing the model generated in Step S230, but Step S240 may additionally or alternatively include fabricating an intermediate structure by any other additive manufacturing process or in any suitable manner (e.g., by injection molding, CNC milling, waterjet cutting).

Step S240 preferably includes fabricating the intermediate structure using a laser-based stereolithography-based 3D printing technique (SLA) or a masked image projection-based SLA technique; Step S240 may additionally or alternatively include fabricating the intermediate structure using extrusion techniques (e.g., fused deposition modeling, syringe deposition), granular techniques (e.g., laser sintering), powder bed techniques, inkjet head techniques (e.g., MultiJet printing, Polyjet), laminated object manufacturing techniques, and/or any other additive manufacturing techniques.

Step S240 preferably includes fabricating the intermediate structure with photopolymers, but may additionally or alternatively include fabricating the intermediate structure with thermoplastics, ceramics, sugar, concrete, heat curable polymers, or any other suitable material.

An alternative embodiment preferably implements the above methods in a computer-readable medium storing computer-readable instructions. The instructions are preferably executed by computer-executable components preferably integrated with a computing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A system for physical link routing comprising:
a first link interface, comprising a first set of access ports arranged in a first rectangular grid pattern;
a second link interface, comprising a second set of access ports arranged in a second rectangular grid pattern; and
a link routing block, comprising a volume of solid material, defining a set of non-intersecting cavities, wherein each cavity of the set of cavities couples exactly one access port of the first set of access ports to exactly one access port of the second set of access ports;
wherein the first link interface and the second link interface are disposed on opposing planar surfaces of the link routing block;
wherein the first set of access ports, the second set of access ports, and the set of cavities are configured to accept optical fibers.

2. The system of claim 1, wherein the system is formed of 3D printed polymer.

3. The system of claim 1, wherein the first rectangular grid pattern comprises a first subgrid and a second subgrid; wherein the second rectangular grid pattern comprises a third subgrid and a fourth subgrid; wherein each access port of the first subgrid is linked to exactly one access port of the third subgrid by a cavity; wherein each access port of the second subgrid is linked to exactly one access port of the fourth subgrid by a cavity; wherein the third subgrid can be related to the first subgrid by a single transformation; wherein the fourth subgrid can be related to the second subgrid by a single transformation; wherein the first rectangular grid pattern cannot be related to the second rectangular grid pattern by a single transformation.

4. A system for physical link routing comprising:
a link routing block, comprising a volume of solid material, that defines a set of link routing paths, wherein each link routing path comprises two endpoints; and
a first link interface, comprising a first set of access points arranged in a first pattern, wherein each access point of the first set of access points is associated with a link routing path endpoint.

5. The system of claim 4, wherein the link routing block further comprises a set of integrated communication links; wherein each of the set of integrated communication links is disposed along a link routing path of the set of link routing paths.

6. The system of claim 5, wherein each of the set of integrated communication links is an optical fiber or optical cable.

7. The system of claim 6, wherein the first link interface further comprises a set of fiber push-on connectors, each of the set of fiber push-on connectors coupled to an integrated communication link of the set of integrated communication links.

8. The system of claim 5, wherein each of the set of integrated communication links is an electrically conductive wire.

9. The system of claim 4, wherein the link routing block defines a set of cavities; wherein each of the cavities is disposed along a link routing path of the set of link routing paths.

10. The system of claim 9, wherein the set of cavities is configured to accept optical fibers or optical cables.

11. The system of claim 9, further comprising a second link interface, wherein the second link interface comprises a second set of access points arranged in a second pattern, wherein each access point of the second set of access points is associated with a link routing path endpoint.

12. The system of claim 11, wherein each cavity of the set of cavities is coupled to one access point of the first set of access points and one access point of the second set of access points.

13. The system of claim 12, wherein the first set of access points is arranged in a rectangular grid pattern having three rows and a plurality of columns; wherein the second set of second access points is also arranged in a rectangular grid pattern having three rows and a plurality of columns.

14. The system of claim 13, wherein the system further comprises a set of optical fibers, each of the set of optical fibers positioned within a cavity of the set of cavities.

* * * * *